United States Patent Office 3,104,201
Patented Sept. 17, 1963

---

3,104,201
3-SUBSTITUTED-2-AZETIDINONES AND PROCESS FOR PREPARING SAME
Emilio Testa and Luigi Fontanella, Milan, Italy, assignors to Lepetit S.p.A., Milan, Italy
No Drawing. Filed Feb. 2, 1959, Ser. No. 790,341
Claims priority, application Great Britain May 6, 1957
19 Claims. (Cl. 167—52)

The present invention relates to new chemical compounds and the processes for preparing them.

More particularly, the invention is concerned with new pharmacologically useful chemical compounds having the general formula

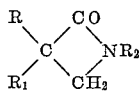

wherein R and $R_1$ are the same or different and represent a lower linear or branched saturated or unsaturated optionally halogen substituted alkyl, or an optionally substituted aryl, aralkyl, cycloalkyl, aminoalkyl and di-loweralkylaminoalkyl radical and $R_2$ is hydrogen or a lower alkyl radical.

This application is a continuation-in-part of our co-pending applications Serial No. 731,635 and No. 731,637, filed April 29, 1958, now abandoned.

The compounds of the invention are very useful as sedatives and hypnotics in humans. The sedative doses may range between 50 and 500 mg.; the hypnotic doses between 200 and 2000 mg. The individual response is of importance for the selection of the appropriate dose. Toxicity is very low, as is shown by the fact that daily doses up to 4–5 g. were well tolerated. On laboratory animals the $LD_{50}$ was very favorable. When given orally to mice, the compounds showed a $LD_{50}$ ranging between 400 and 600 mg./kg. and more.

For therapeutic purposes the compounds are best given in the form of tablets of 50–500 mg. They may obviously be also incorporated in capsules, elixirs and other common pharmaceutical compositions.

According to one process of the invention, the new compounds are prepared by hydrogenating an α,α-disubstituted cyanoacetic acid alkyl ester of the formula

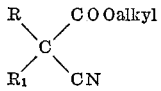

wherein R and $R_1$ are as defined above with Raney nickel in an inert anhydrous organic solvent, such as anhydrous ethanol, under a pressure of 10–150 atmospheres and at temperatures between 20° and 100° C. to form an α,α-disubstituted β-aminopropionic acid ester of the formula

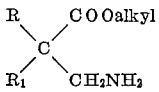

This ester is then transformed into the free carboxylic acid by hydrolysis with a strong mineral acid, then into the hydrochloride of the corresponding carboxylic acid chloride by reaction with phosphorus pentachloride in acetyl chloride between about 0° C. and 20° C.

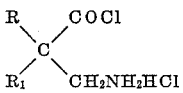

This compound, suspended in an anhydrous inert solvent, is then treated with anhydrous ammonia or a tertiary amino base at room or lower temperature. On evaporation of the solvent, the desired compounds are obtained in fairly good yields.

The starting compounds may be prepared in turn by two different methods. By the first procedure, an α,α-disubstituted malonic acid dialkyl ester (I) is partially hydrolysed to the monoester (II), which by treatment with thionyl chloride is transformed into the monoester chloride (III). This compound on treatment with anhydrous ammonia in an anhydrous organic solvent gives the amide ester (IV), which in turn gives the desired starting compound of the invention by heating with phosphorus pentoxide.

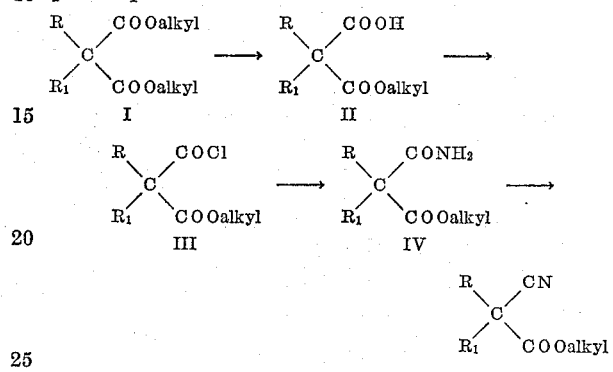

Alternatively, a nitrile of the formula $RCH_2CN$ wherein R is as defined above is reacted with anhydrous diethyl carbonate in an anhydrous inert organic solvent such as toluene, in the presence of an alcohol-free sodium alkoxide. The obtained alkyl α-arylcyanoacetate

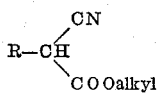

is converted into the disubstituted derivative by treatment with an alkyl halide in the presence of a sodium ethoxide according to well known procedures. Obviously this procedure may be used only in cases where $R_1$ is an aliphatic alkyl or a cycloalkyl radical. When one or both of the symbols R and $R_1$ are cycloalkyl, it is apparent that the compounds of the invention may be prepared also by hydrogenation of corresponding saturated derivatives.

By an alternative process, the compounds of the invention are prepared by reacting one mole of an aminoester of the formula

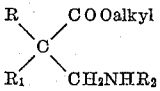

with 2–4 moles of an alkylmagnesium halide in an anhydrous organic solvent such as benzene or ethyl ether or mixtures thereof at a temperature between 0° and 5° C. for 1–8 hours.

The excess alkylmagnesium halide is destroyed by the addition of water or of a water solution of an inorganic salt, preferably ammonium chloride and the organic layer is then separated and evaporated to dryness.

Yields are usually very high, ranging between 85 and 95% of the theoretical amount.

In the case R and $R_1$ in the generic formula

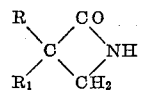

are different radicals, the compounds of the invention possess an asymmetrical carbon atom and may therefore exist in racemic and optically active forms. It is intended that the application cover all possible optical forms of the compound of the invention. For the sake of clearness, a process for preparing the optically active compounds is given in the examples.

The following non-limitative examples illustrate the invention.

EXAMPLE 1

3-Phenyl-3-Ethyl-2-Azetidinone

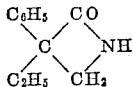

A mixture of 25 g. monoethyl α-phenyl-α-ethylmalonate is refluxed for 2 hrs. with 25 ml. thionyl chloride. The excess thionyl chloride is removed in vacuo and the residue is distilled collecting the fraction boiling at 130–132° C./3 mm. Yield 25 g. (92%) ethyl α-phenyl-α-ethylmalonyl chloride.

Into a solution of 6.3 g. ethyl α-phenyl-α-ethylmalonyl chloride in 50 ml. anhydrous ethyl ether, ammonia is bubbled for about 30 minutes, then the solution is filtered and evaporated to a small volume. On cooling, α-carbethoxy-α-phenylbutyramide crystallizes and is collected by suction. Yield 5.5 g. (95%); M.P. 77.79° C.

An intimate mixture of 35 g. α-carbethoxy-α-phenylbutyramide and 16 g. phosphorus pentoxide is gradually heated to 150–160° C. in vacuo in a flask provided with distilling apparatus. A clear oil distils at 118–120° C./1.5 mm. Yield 30 g. (93%) ethyl α-cyano-α-phenylbutyrate.

A mixture of 25 g. ethyl α-cyano-α-phenylbutyrate, 200 ml. anhydrous ethanol and 6 g. Raney nickel is heated for 6 hrs. in an autoclave at 60° C. at 75 atmos. hydrogen pressure. The mixture is allowed to cool overnight, then it is filtered, the solvent is removed in vacuo, and the residue is acidified with hydrochloric acid and extracted with ethyl ether. The water layer is made alkaline by addition of aqueous sodium carbonate and extracted with ethyl ether. After evaporation of ether the residue distils at 130° C./1.5 mm. Yield 22 g. (86%) of ethyl α-ethyl-α-phenyl-β-aminopropionate.

The above ester (36 g.) is hydrolysed by refluxing it with concentrated hydrochloric acid for 6 hrs. After evaporation in vacuo of all the hydrochloric acid, the residue is taken up in 100 ml. water and adjusted to pH 6.0 with sodium carbonate solution. The precipitated white product is collected by suction. Yield 28 g. (90%) α-ethyl-α-phenyl-β-aminopropionic acid, M.P. 278–279° C.

Ten grams of the amino acid are suspended in 100 ml. acetyl chloride, and with cooling at 0° C. 12 g. phosphorus pentachloride are added quickly. The mixture is stirred for 20 minutes at room temperature and then it is filtered. The collected solid decomposes at about 170° C. Yield 11 g. (86%) α-ethyl-α-phenyl-β-aminopropionyl chloride hydrochloride.

Ten grams of the above hydrochloride are suspended in anhydrous ethyl ether, then dry ammonia is bubbled in for 30 minutes. After filtration of insoluble material, the filtrate is concentrated to dryness and the residue is recrystallized from petroleum ether-benzene. Yield 6.5 g. (92%) (3-phenyl-3-ethyl-2-azetidinone, M.P. 69–70° C. Analysis.—Calculated, percent, for C₁₁H₁₃NO (M.W. 175.22): C, 75.39; H, 7.48; N, 7.94. Found, percent: C, 75.12; H, 7.21; N, 8.11. The molecular weight determination according to Rast gave 169; the cryoscopic determination in acetic acid gave 172.

EXAMPLE 2

3,3-Diethyl-2-Azetidinone

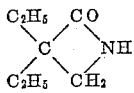

A mixture of 121 g. ethyl α-ethyl-α-cyanobutyrate, 430 ml. anhydrous ethanol and 50 g. Raney nickel is heated in an autoclave at about 70 hydrogen atmos. and 80° C. temperature for 2 hours.

After cooling the mixture is filtered from the catalyst. The filtrate is evaporated to dryness in vacuo, the residue taken up with 200 ml. water, acidified with 10% hydrochloric acid and extracted with ethyl ether, which is then discarded. The aqueous layer is made alkaline with concentrated sodium carbonate solution and extracted with ethyl ether. After removing the ether in vacuo the residue is distilled collecting the fraction passing at 85–90° C./8 mm. Yield 106 g. (85%) ethyl α,α-diethyl-β-aminopropionate.

The above ester (65 g.) is hydrolysed by refluxing it with concentrated hydrochloric acid (1250 ml.) for 10 hrs. On cooling, the hydrochloride of the amino acid separates, having M.P. 166–167° C. The free amino acid is obtained by dissolving the hydrochloride in water, making the solution alkaline and extracting with ethyl ether. Yield is practically quantitative; M.P. 239–240° C.

To a mixture, previously cooled to 0° C., of 5 g. α,α-diethyl-β-aminopropionic acid and 50 ml. acetyl chloride 5 g. phosphorus pentachloride are added in one portion; the mixture is stirred at 0° for 20 minutes and at room temperature for 2 hrs. The crystals are collected by suction and washed with ethyl ether. Yield 5 g. (75%) of α,α-diethyl-β-aminopropionyl chloride hydrochloride, M.P.128–130° C.

Into a mixture of 4 g. of the above compound and 100 ml. ethyl ether, ammonia is bubbled for about 40 minutes, then the solid is filtered and discarded and the ether solution is evaporated to dryness. The oily residue is distilled collecting at 115–120° C./4 mm. Yield 2.2 g. (87%) of 3,3-diethyl-2-azetidinone. Analysis.—Calculated, percent, for C₇H₁₃NO (M.W. 127.18): C, 66.10; H, 10.30; N, 11.01. Found, percent: C, 66.18; H, 10.16; N, 10.87.

EXAMPLE 3

3-Phenyl-3-Methyl-2-Azetidinone

A mixture of 68 g. ethyl α,α-phenyl-α-methyl-β-aminopropionate and 1200 ml. concentrated hydrochloric acid is refluxed for 10 hrs. and then allowed to stand overnight. The precipitate is collected in vacuo, dissolved in a small amount of water at about 50° C. and treated with aqueous potassium hydrate to pH 6–6.2. After cooling, the precipitate is colleceted in vacuo and dried, Yield 52 g. (88%) of α-methyl-α-phenyl-β-aminopropionic acid.

Fifty grams of the above amino acid are dissolved in 500 ml. acetyl chloride. After cooling at 0° 60 g. phosphorus pentachloride are added and the mixture is stirred for 3 hrs. at room temperature. The solid is collected and washed with ethyl ether. Yield 65 g. (99%) of α-phenyl-α-methyl-β-aminopropionyl chloride hydrochloride, M.P. 144–147° (with dec.).

The above compound (36 g.) is suspended in 600 ml. ethyl ether, then 36 ml. triethylamine are cautiously added over 30 minutes, followed by 600 ml. water. The mixture is extracted with ethyl ether and the solvent removed in vacuo. The residue is recrystallized from benzene. Yield 18 g. (72%) of 3-phenyl-3-methyl-2-azetidinone, M.P. 92–94° C.

EXAMPLE 4

3,3-Diphenyl-2-Azetidinone

A mixture of 70 g. ethyl α,α-diphenyl-α-cyanoacetate, 400 ml. ethyl alcohol and 20 g. Raney nickel is hydrogenated under 80–90 atmos. at 80–100° C. until 2 molar equivalents are adsorbed. The catalyst is filtered off, the solvent removed in vacuo and the residue acidified with a small amount of water and hydrochloric acid. After extraction with ethyl ether the solvent is removed and the residue recrystallized from ethyl alcohol. Yield 50 g. (70%) of ethyl α,α-diphenyl-β-aminopropionate, M.P. 58–60° C.; B.P. 165–167° C./1 mm. The hydrochloride melts at 194–197° C. with decomposition.

Fifty grams of the above ester are refluxed with 100 ml. concentrated hydrochloric acid for 10 hrs. giving 49 g. of the hydrochloride of the free acid, M.P. 225–228° C. (with dec.). To a mixture of 25 g. α,α-diphenyl-β-aminopropionic acid hydrochloride and 350 ml. acetyl chloride, previously cooled to 0° C., 30 g. phosphorus pentachloride are added, then the mixture is stirred at 0° for 30 minutes and at room temperature for 3 hours. The solid is collected and washed with anhydrous ethyl ether. Yield 26.5 g. (quantitative) of α,α-diphenyl-β-aminopropionyl chloride hydrochloride, M.P. 138–140° C. (dec.).

To 5 g. of the above product in 100 ml. ethyl ether 5 ml. triethylamine are added in portions in a few minutes. After 15 minutes at room temperature the reaction mixture is treated with 200 ml. ethyl ether and 100 ml. water, the ether layer separated and evaporated until crystals begin to separate. After cooling the precipitate is collected in vacuo. Yield 3.1 g. (82%) of 3,3-diphenyl-2-azetidinone; M.P. 172–173° C.

EXAMPLE 5

*3-Phenyl-3-(2-Methylpropyl)-2-Azetidinone*

A mixture of 108 g. ethyl α-phenyl-α-(2-methylpropyl)-α-cyanoacetate, 350 ml. anhydrous ethyl alcohol and 50 g. Raney nickel is hydrogenated under 60 atmos. at 60–90° C. for 3 hours. The catalyst is filtered off, the solvent removed in vacuo and the residue acidified with water and 10% hydrochloric acid. The mixture is extracted with ethyl ether and the extract is discarded. The water layer is made alkaline with aqueous sodium carbonate, extracted with ethyl ether, the solvent removed and the residue distilled collecting at 117–120° C./1 mm. Yield 83 g. (75%) of ethyl α-phenyl-α-(2-methylpropyl)-β-aminopropionate.

The above ester is hydrolysed with concentrated hydrochloric acid. Yield 88% of the free acid, M.P. 241–243° C. The acid is converted into the hydrochloride of the acyl chloride by reacting it with phosphorus pentachloride as described in Example 4 for the diphenyl analogue. Yield quantitative; M.P. 146–149° C. (dec.).

A mixture of 7 g. α-phenyl-α-(2-methylpropyl)-β-aminoacetyl chloride hydrochloride, 100 ml. anhydrous ethyl ether and 10 ml. triethylamine is stirred at room temperature for 30 minutes, then it is diluted with 200 ml. water, extracted with ethyl ether, the solvent removed and the residue recrystallized from benzene-petroleum ether. Yield 4.5 g. (87%) of 3-phenyl-3-(2-methylpropyl)-2-azetidinone; M.P. 120–122° C.

EXAMPLE 6

*3-Phenyl-3-Butyl-2-Azetidinone*

A mixture of 120 g. ethyl α-phenyl-α-butyl-α-cyanoacetate, 320 ml. absolute ethyl alcohol and 50 g. Raney nickel is hydrogenated as described in the preceding examples. Yield 96 g. (87%) ethyl α-phenyl-α-butyl-β-aminopropionate; B.P. 120° C., 0.5 mm.

The above ester (65 g.) is hydrolysed by refluxing it with 1200 ml. concentrated hydrochloric acid giving 56 g. (97%) of the corresponding acid, M.P. 251–253° C. (dec.), which in turn is converted into the acyl chloride hydrochloride with phosphorus pentachloride.

Into a suspension of 4 g. α-phenyl-α-butyl-β-aminopropionyl chloride hydrochloride in 80 ml. anhydrous ethyl ether, ammonia is bubbled for about 1 hr. The solid is filtered off and the filtrate evaporated to dryness. The residual oil crystallizes on standing. Yield 2.5 g. (85%) 3-phenyl-3-butyl-2-azetidinone, M.P. 65–66° C.

EXAMPLES 7 TO 10

The following compounds were prepared through the intermediates indicated hereinafter in the table. The melting or boiling points, yields and the base used in the final ring closure are also indicated. The procedure was much the same as described in the above 6 examples.

| Ex. | | R\C/COOC₂H₅ R'/\CH₂NH₂ | R\C/COOH R'/\CH₂NH₂ | R\C/COCl R'/\CH₂NH₂·HCl | Azetidinone | Base |
|---|---|---|---|---|---|---|
| 7 | R=ethyl. R'=cyclohexyl. | B.P. 101–102° C./0.8 mm. Y. 76%. | M.P. 242–244° C. Y. 88%. | M.P. 158–160° C. Y. 82%. | M.P. 70–71° C. Y. 82%. | Triethylamine. |
| 8 | R=phenyl. R'=cyclohexyl. | B.P. 132–135° C./2 mm. Y. 46%. | M.P. 289–292° C. Y. 92%. | M.P. 169–170° C. Y. 82%. | M.P. 175–176° C. Y. 72%. | Ammonia. |
| 9 | R=phenyl. R'=benzyl. | B.P. 170–172° C./0.5 mm. Y. 66%. | M.P. 277–280° C. Y. 44%. | M.P. 150–151° C. Y. 77%. | M.P. 129–130° C. Y. 86%. | Ammonia. |
| 10 | R=ethyl. R'=benzyl. | B.P. 135–137° C./0.6 mm. Y. 57%. | M.P. 267–268° C. Y. 88%. | M.P. 160–162° C. Y. 94%. | M.P. 50° C. Y. 72%. | Ammonia. |

EXAMPLE 11

| | G. |
|---|---|
| 3-phenyl-3-ethyl-2-azetidinone | 0.2 |
| Cornstarch | 0.03 |
| Lactose | 0.255 |
| Magnesium stearate | 0.015 |

The four substances are thoroughly mixed and tabletted to give one tablet of 0.5 g.

EXAMPLE 12

| | G. |
|---|---|
| 3-phenyl-3-ethyl-2-azetidinone | 0.4 |
| Cornstarch | 0.023 |
| Lactose | 0.1 |
| Talc | 0.044 |
| Stearic acid | 0.033 |

The five substances are thoroughly mixed and tabletted to give one tablet of 0.6 g.

EXAMPLE 13

| | G. |
|---|---|
| 3-phenyl-3-methyl-2-azetidinone | 0.25 |
| Cornstarch | 0.02 |
| Lactose | 0.22 |
| Stearic acid | 0.01 |

The four substances are thoroughly mixed and tabletted to give one tablet of 0.5 g.

EXAMPLE 14

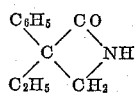

Ethylmagnesium bromide is prepared according to usual procedures from 14.6 g. magnesium turnings and 65.4 g. ethyl bromide in 300 ml. anhydrous benzene and 40 ml. ethyl ether. The mixture is cooled to 0°, then a solution of 44.2 g. ethyl α-phenyl-α-aminomethylbutyrate in 80 ml. anhydrous benzene is added slowly over one hour without exceeding 5° C. After 2 hours at 0° and 4 hours at room temperature 150 ml. of a 10% aqueous ammonium chloride solution are slowly added, followed by 150 ml. water. The supernatant layer is separated and the aqueous layer is extracted with two 150 ml. portions of benzene. The combined extracts are dried over sodium sulphate and evaporated to dryness. The residue is recrystallized from ligroin. Yield 33.5 g. (96%) of 3-phenyl-3-ethyl-2-azetidinone; M.P. 69–70° C.

EXAMPLE 15

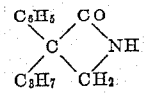

Ethylmagnesium bromide is prepared from 9.72 g. magnesium turnings and 43.6 g. ethyl bromide in 100 ml. anhydrous ethyl ether, then 47 g. ethyl α-phenyl-α-aminomethyl valerate are slowly added over one hour without exceeding 5° C. After one hour at 0° and 3 hours at room temperature 100 ml. water are cautiously added to the mixture. The ether layer is then separated and the water layer is extracted with ethyl ether. The combined extracts are evaporated to dryness and the residue is distilled collecting at 135–140° C. under 0.2 mm. Yield 35 g. (91%) of 3-phenyl-3-n-propyl-2-azetidinone; M.P. 42–44° C.

EXAMPLE 16

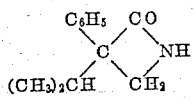

Butylmagnesium bromide is prepared from 9.72 g. magnesium turnings and 55 g. butyl bromide in 200 ml. anhydrous ethyl ether, then 47 g. ethyl α-phenyl-α-aminomethylisovalerate are slowly added over one hour without exceeding 5° C. After 1 hour at 0° and 2 hours at room temperature the mixture is cautiously treated with 100 ml. of a 10% aqueous sodium chloride solution followed by 100 ml. water. The ether layer is separated and the water layer is extracted with ethyl ether. The combined extracts are evaporated to dryness and the residue is recrystallized from ligroin. Yield 32 g. (88%) of 3-phenyl-3-isopropyl-2-azetidinone; M.P. 105–107° C.

EXAMPLES 17 TO 23

The following 2-azetidinones were prepared according to the claimed process and under the following conditions

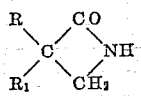

| Ex. | R | $R_1$ | Alkyl halide | Solvent | Yield, percent | M.P. or B.P., °C. |
|---|---|---|---|---|---|---|
| 17 | Ethyl | Ethyl | Ethyl chloride | Ethyl ether | 88 | 100–110/4mm. |
| 18 | Phenyl | Phenyl | Ethyl bromide | Benzene | 92 | 171–173 |
| 19 | ...do | Methyl | Butyl chloride | ...do | 85 | 95–97 |
| 20 | ...do | Isobutyl | Butyl bromide | ...do | 85 | 120–122 |
| 21 | ...do | Cyclohexyl | Ethyl bromide | Ethyl ether | 90 | 175–176 |
| 22 | ...do | Benzyl | ...do | ...do | 87 | 129–130 |
| 23 | Ethyl | ...do | Butyl bromide | Benzene | 92 | 50 |

EXAMPLE 24

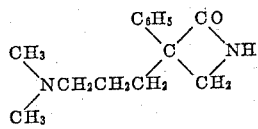

To a solution of 6.32 g. sodium in 125 ml. ethyl alcohol a solution of 47.3 ethyl α-cyano-α-phenylacetate in 200 ml. ethyl alcohol is added slowly between 40 and 60° C., followed by 30 g. 3-dimethylamino-1-chloropropane; the mixture is then refluxed for 4 hrs. The inorganic precipitate is filtered off, the solvent is removed in vacuo and the residue mixed with 250 ml. water. The mixture is made acidic with hydrochloric acid, extracted with ethyl ether, the water layer made alkaline with sodium carbonate and extracted with ethyl ether. This ether extract is evaporated to dryness and the residue distilled collecting at 135–140° C. under 0.4 mm. Yield 52 g. (76%) of ethyl α-cyano-α-phenyl-δ-dimethylamino-valerate.

A mixture of 45 g. of the above ester, 22.5 g. Raney nickel and 45 ml. anhydrous ethyl alcohol is hydrogenated for 2 hours at 90° C. under 70 atmos. of hydrogen pressure. The mixture obtained is filtered from the catalyst and evaporated to dryness in vacuo. The residue is distilled collecting at 140–145° under 0.5 mm. Yield 40 g. (88%) of ethyl α-aminomethyl-α-phenyl-δ-dimethylamino-valerate.

To a Grignard reagent prepared from 4.4 g. magnesium turnings, 20 g. ethyl bromide and 100 ml. ethyl ether, 20 g. of the above ester are gradually added without overcoming 5° C. This temperature is maintained for an additional hour, then 40 ml. 10% aqueous ammonium chloride are added in portions. The ether layer is separated, the water layer is extracted with ether and the combined ether extracts are evaporated to dryness.

The residue is distilled collecting at 160° C. under 0.2 mm. Yield 14 g. (84%) of 3-phenyl-3-(γ-dimethylaminopropyl)-2-azetidinone.

With methyl iodide the compound gives the methoiodide, M.P. 70° C. (dec.).

EXAMPLE 25

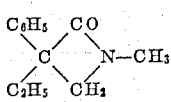

A mixture of 33.2 g. ethyl α-phenyl-α-aminomethylbutyrate, 220 ml. formic acid and 12 ml. aqueous 36.3% formaldehyde is heated for 2.5 hrs. at 105–110° C. After this period the gaseous evolution subsides. The mixture is evaporated in vacuo to dryness, the residue is diluted with water, made neutral with aqueous sodium bicarbonate and extracted with ethyl ether. The ether extract is evaporated to dryness and the residue distilled collecting at 102–104° C. under 0.5 mm. Yield 20 g. (57%) of ethyl α-phenyl-α-methylaminomethylbutyrate.

To a Grignard reagent prepared from 29.5 g. magnesium turnings, 132 g. ethyl bromide and 600 ml. ethyl ether a solution of 14.25 g. ethyl α-phenyl-α-methylaminomethylbutyrate in 120 ml. ethyl ether is added over one hour at 0.5 C. The mixture is then worked up as described in the preceding examples. Yield 9 g. (78%) of 1-methyl-3-phenyl-3-ethyl-2-azetidinone, B.P. 105–109° C. under 0.5 mm.

What we claim is:

1. A compound of the formula

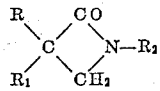

wherein R is a member of the class consisting of lower alkyl and phenyl, $R_1$ is a member of the class consisting of lower alkyl, cyclohexyl, dimethylamino-propyl, phenyl, and benzyl, and $R_2$ is a member of the class consisting of hydrogen and lower alkyl.

2. 3-phenyl-3-ethyl-2-azetidinone.
3. 3-phenyl-3-methyl-2-azetidinone.

4. 3-cyclohexyl-3-ethyl-2-azetidinone.
5. 3-benzyl-3-ethyl-2-azetidinone.
6. 3-phenyl-3-ethyl-1-methyl-2-azetidinone.
7. 3-phenyl-3-dimethylaminopropyl-2-azetidinone.
8. A process for preparing a 3,3-disubstituted 2-azetidinone of the formula

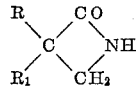

wherein R is a member of the class consisting of lower alkyl and phenyl, $R_1$ is a member of the class consisting of lower alkyl, cyclohexyl, dimethylamino-propyl, phenyl, and benzyl, which comprises refluxing an alkyl alpha,alpha-disubstituted-β-aminopropionate of the formula

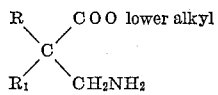

with a strong mineral acid, stirring the resulting α,α-disubstituted-β-aminopropionic acid with an excess of phosphorus pentachloride in acetyl chloride at a temperature between 0° and 20° C. and contacting the resulting α,α-disubstituted-β-aminopropionyl chloride hydrochloride with a base of the class consisting of ammonia and lower aliphatic trialkylamines.

9. A process as claimed in claim 8 wherein the strong mineral acid with which the alkyl α,α-disubstituted-β-aminopropionate is refluxed is concentrated hydrochloric acid.

10. The process as claimed in claim 8, wherein the alpha, alpha-disubstituted beta-aminopropionyl chloride hydrochloride, is contacted with the base in anhydrous ethyl ether.

11. In a process for preparing a 3,3-disubstituted 2-azetidinone of the formula

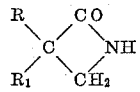

wherein R is a member of the class consisting of lower alkyl and phenyl, $R_1$ is a member of the class consisting of lower alkyl, cyclohexyl, dimethylamino-propyl, phenyl, and benzyl, the steps which comprise refluxing an α,α-disubstituted alkyl β-aminopropionate of the formula

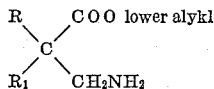

with a strong mineral acid, stirring the obtained α,α-disubstituted β-aminopropionic acid with an excess of phosphorus pentachloride in acetyl chloride at a temperature between 0° and 20° C. and contacting the resulting α,α-disubstituted β-aminopropionyl chloride hydrochloride with a base of the class consisting of ammonia and lower aliphatic trialkylamines at room temperature in the presence of an anhydrous inert organic solvent.

12. A process as claimed in claim 11 wherein the strong mineral acid with which the alkyl α,α-disubstituted β-aminopropionate is refluxed is concentrated hydrochloric acid.

13. A process as described in claim 11 wherein the anhydrous inert organic solvent is anhydrous ethyl ether.

14. Process according to claim 11, wherein the alpha, alpha-disubstituted beta-aminopropionyl chloride hydrochloride is contacted with an excess over two equivalents of the base.

15. A process for preparing 3-phenyl-3-ethyl-2-azetidinone, which comprises contacting α-phenyl-α-ethyl-β-aminopropionyl chloride hydrochloride with an excess over two equivalents of ammonia in anhydrous ethyl ether.

16. A therapeutic composition containing as the active ingredient not less than 5 percent and up to 95% of a 3,3-disubstituted 2-azetidinone of the formula

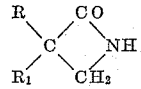

wherein R is a member of the class consisting of lower alkyl and phenyl, $R_1$ is a member of the class consisting of lower alkyl, cyclohexyl, dimethylamino-propyl, phenyl, and benzyl, and an inert, solid pharmaceutical carrier.

17. A therapeutic composition in unit dosage tablet form containing as the active ingredient in each tablet about 50 to about 500 mg. of a 3,3-disubstituted 2-azetidinone of the formula:

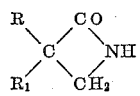

wherein R is a member of the class consisting of lower alkyl and phenyl, $R_1$ is a member of the class consisting of lower alkyl, cyclohexyl, dimethylamino-propyl, phenyl, and benzyl, and an inert, solid pharmaceutical carrier.

18. 3-phenyl-3-butyl-2-azetidinone.
19. 3,3-diphenyl-2-azetidinone.

References Cited in the file of this patent

UNITED STATES PATENTS

| | | |
|---|---|---|
| 2,365,295 | Schaff | Dec. 19, 1944 |
| 2,501,825 | Lincoln | Mar. 28, 1950 |
| 2,514,549 | Lincoln | July 11, 1950 |
| 2,525,794 | Gresham | Oct. 17, 1950 |

OTHER REFERENCES

Clarke et al.: The Chem. of Penicillin, pages 975–983 (1949), Princeton Univ. Press, New Jersey.